(12) United States Patent
Manna et al.

(10) Patent No.: US 11,126,772 B1
(45) Date of Patent: Sep. 21, 2021

(54) TOOLS AND METHODS FOR DESIGNING A CIRCUIT, AND CIRCUITS MADE THEREBY

(71) Applicant: Dialog Semiconductor (UK) Limited, London (GB)

(72) Inventors: Indrajit Manna, Cheltenham (GB); Peter Bell, Wokingham (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/511,541

(22) Filed: Jul. 15, 2019

(51) Int. Cl.
| | |
|---|---|
| *G06F 30/30* | (2020.01) |
| *G06F 30/36* | (2020.01) |
| *G06F 30/392* | (2020.01) |
| *G06F 30/367* | (2020.01) |
| *G06F 30/398* | (2020.01) |
| *G06F 30/38* | (2020.01) |
| *G06F 30/373* | (2020.01) |
| *G06F 30/27* | (2020.01) |
| *G06F 111/06* | (2020.01) |

(52) U.S. Cl.
CPC .............. *G06F 30/36* (2020.01); *G06F 30/27* (2020.01); *G06F 30/367* (2020.01); *G06F 30/373* (2020.01); *G06F 30/38* (2020.01); *G06F 30/392* (2020.01); *G06F 30/398* (2020.01); *G06F 2111/06* (2020.01)

(58) Field of Classification Search
CPC ........ G06F 30/27; G06F 30/36; G06F 30/367; G06F 30/373; G06F 30/38; G06F 30/392; G06F 30/398; G06F 2111/06
See application file for complete search history.

(56) References Cited

U.S. PATENT DOCUMENTS

| | | | | |
|---|---|---|---|---|
| 9,792,397 B1* | 10/2017 | Nagaraja | ............... | G06F 30/327 |
| 9,798,846 B2* | 10/2017 | Rajagopalan | ........... | G06F 30/36 |
| 2015/0089463 A1* | 3/2015 | Kuo | ...................... | G06F 30/367 |
| | | | | 716/106 |

(Continued)

OTHER PUBLICATIONS

Z.-Q. Ning et al., "SEAS: A Simulated Evolution Approach for Analog Circuit Synthesis," IEEE 1991 Custom Integrated Circuits Conference, 4 pages. (Year: 1991).*

(Continued)

*Primary Examiner* — Leigh M Garbowski
(74) *Attorney, Agent, or Firm* — Saile Ackerman LLC; Stephen B. Ackerman

(57) ABSTRACT

A method to provide an automated circuit design tool that mitigates or overcomes the inefficiencies present in the prior art tools ensuring a more efficient use of computer resources and a reduction in the time taken to design a suitable circuit that meets the design specification is presented. The computer-implemented method of designing a circuit configuration of a circuit, has the following steps 1) providing a first set of circuit configurations comprising one or more circuit configurations, 2) simulating each, circuit configuration of the first set of circuit configurations. In addition, the steps include: 3) scoring each, circuit configuration of the first set of circuit configurations based on a design specification and the simulation, or simulations, of step 2), and 4) providing a second set of circuit configurations comprising one or more circuit configurations that are dependent on the scores as determined in step 3).

21 Claims, 10 Drawing Sheets

(56) References Cited

U.S. PATENT DOCUMENTS

2018/0260498 A1* 9/2018 Nagaraja ............. G06F 30/3323
2019/0205762 A1* 7/2019 Sher ....................... G06N 3/086

OTHER PUBLICATIONS

P.B. Wu et al., "A Qauntatative Method for Evaluating the Quality of Analog Layout," Proc. 43rd IEEE Midwest Symposium on Circuits and Systems, 2000, pp. 1140-1143. (Year: 2000).*

T. McConaghy et al., "Simultaneous Multi-Topology Multi-Objective Sizing Across Thousands of Analog Circuit Topologies," ACM DAC 2007, pp. 944-947. (Year: 2007).*

Y. Yang et al., "Smart-MSP: A Self-Adaptive Multiple Starting Point Optimization Approach for Analog Circuit Synthesis," IEEE Trans. on Computer-Aided Design of Integrated Circuits and Systems, vol. 37, No. 3, Mar. 2018, pp. 531-544. (Year: 2018).*

"Simulated Annealing," by Dimitris Bertsimas et al., Statistical Science, vol. 8, No. 1 (1993), pp. 10-15.

"Automated Analog Circuit Design Using Genetic Algorithms," by Yanfeng Jiang et al., 2009 3rd International Conference on Anti-counterfeiting, Security, and Identification in Communication, Aug. 20-22, 2009, 6 pages.

Design of Analog CMOS Integrated Circuits, Second Edition, Behzad Razavi, Copyright 2017 by McGraw-Hill, New York, NY, pp. 1-782.

Reinforcement Learning: An Introduction, Second edition, in progress, Nov. 5, 2017, Richard S. Sutton et al., a Bradford Book, The Mit Press, Cambridge, Massachusetts, pp. 1-427.

* cited by examiner

| Episode # | | | | | | | Comment |
|---|---|---|---|---|---|---|---|
| Episode 1: S0 | -1 | → S1 | -1 | → S2 | -1 | → | End Episode terminated, voltage headroom exhausted Episode used for state value update even though no reward is obtained |
| Episode 2: S0 | -1 | → S1 | -1 | → S3 | +100 | → | End Episode terminated, terminal state reached, objective met, reward obtained Episode used for state value update |
| Episode 3: S0 | -1 | → S1 | -1 | → S2 | +50 | → | End Episode terminated, terminal state reached, object met (not as good as Episode 2 → smaller reward) Episode used for state value update |

FIG. 7

TOOLS AND METHODS FOR DESIGNING A CIRCUIT, AND CIRCUITS MADE THEREBY

TECHNICAL FIELD

The present disclosure relates to tools and methods for designing a circuit, and a circuit made thereby.

BACKGROUND

Based on a design specification and prior experience, a circuit designer, for example an analog circuit designer, puts together a circuit configuration that has a high probability of meeting design objectives, as outlined in the design specification. Subsequently, many simulations are performed to fine tune circuit parameters to arrive at an optimal analog circuit design. In many cases, circuit topologies have not changed much over the years due to difficulties in exploring alternative topologies and time constraints involved in typical design cycles.

When process technologies change, analog circuit designers are faced with evaluating and tweaking known circuit configurations to figure out which ones will work best in the new process technology. This exploration process is manual and time-consuming, which delays the adoption of new process technologies.

In the past, attempts have been made to design analog circuits from a design specification in an automated manner. All of these methods are based on metaheuristics such as simulated annealing (Bertsimas, D., & Tsitsiklis, J. (1993). Simulated Annealing. Statistical Science, Vol 8, No 1, pp 10-15), swarm intelligence or genetic algorithms (Jiang, Y. (2009). Automated analog circuit design using Genetic Algorithms. Hong Kong, China: 3rd International Conference on Anti-counterfeiting, Security, and Identification in Communication).

The idea behind most of these algorithms is to randomly generate many circuit architectures and see which one come close to design criteria. A mechanism is provided to prune from generated circuit configurations. After many trials, interesting circuit topologies may begin to emerge. Thus, the above methods waste a lot of computing resources and are slow in discovering circuit topologies, if at all successful.

SUMMARY

It is desirable to provide automated circuit design tool that mitigates or overcomes the inefficiencies present in the prior art tools, thereby ensuring a more efficient use of computer resources and a reduction in the time taken to design a suitable circuit that is close to, or meets, the design specification.

According to a first aspect of the disclosure there is provided a computer-implemented method of designing a circuit configuration of a circuit, comprising the following steps 1) providing a first set of circuit configurations comprising one or more circuit configurations, 2) simulating the, or each, circuit configuration of the first set of circuit configurations, 3) scoring the, or each, circuit configuration of the first set of circuit configurations based on a design specification and the simulation, or simulations, of step 2), and 4) providing a second set of circuit configurations comprising one or more circuit configurations that are dependent on the scores as determined in step 3).

Optionally, i) in step 1) providing the first set of circuit configurations comprises providing a first circuit configuration, sequentially updating from the first circuit configuration to provide at least one first subsequent circuit configuration, wherein the sequential updating continues until an end condition is met, and/or ii) in step 4) providing the second set of circuit configurations comprises providing a second circuit configuration, sequentially updating from the second circuit configuration to provide at least one second subsequent circuit configuration, wherein the sequential updating is dependent on the scores as determined in step 3) and the sequential updating continues until an end condition is met.

Optionally, the end condition is met when at least one of the following occurs sequential updating from the first circuit configuration exceeds a limit of sequential updates, sequential updating from the second circuit configuration exceeds a limit of sequential updates, and the score of one of the circuit configurations meets, or exceeds, a target value.

Optionally, the method comprises the following steps 5) simulating the, or each, circuit configuration of the second set of circuit configurations, 6) scoring the, or each, circuit configuration of the second set of circuit configurations based on the design specification and the simulation, or simulations, of step 5), and 7) if an end condition is not met i) providing an updated set of circuit configurations comprising one or more circuit configurations that are dependent on the scores as determined in the previous simulation step, ii) simulating the, or each, circuit configuration of the updated set of circuit configurations, iii) scoring the, or each, circuit configuration of the updated set of circuit configurations based on the design specification and the simulation, or simulations, of step ii), and iv) if the end condition is not met, repeating steps i) to iii) until the end condition is met.

Optionally, the end condition is met when at least one of the following occurs the number of sets of circuit configurations meets, or exceeds, a limit value, and the score of one of the circuit configurations meets, or exceeds, a target value.

Optionally, in step 6) scoring of the, or each, circuit configuration of the second set of circuit configurations comprises updating the score of the, or each, circuit configuration that is also present in the first set of circuit configurations and already has a score as acquired in step 3).

Optionally, the design specification comprises one or more circuit properties, and in step 3) scoring the, or each, circuit configuration comprises comparing the, or each, property of the design specification to the, or each, associated property of the, or each, circuit configuration as determined by the simulation of step 2), applying a value to the score of the, or each, circuit configuration for the, or each, property of the design specification based on the comparison.

Optionally, the one or more circuit properties comprises at least one of a gain, a bandwidth, an input impedance, an output impedance, linearity objectives, transistor number and a circuit area.

Optionally, the first set of circuit configurations comprises a first circuit configuration, and a step prior to step 1) comprises receiving the first circuit configuration from a user, or generating the first circuit configuration.

Optionally, each version of the circuit configuration comprises a plurality of components, and/or a plurality of connections, wherein each connection couples at least two components.

Optionally, each component has its type, attributes and connections encoded in a binary format.

Optionally, the circuit configuration comprises a linear combination of encoded components.

Optionally, the components comprise at least one of a node, a transistor, a current source, a voltage source, a resistor, and inductor, a capacitor and an amplifier.

Optionally, the components comprise at least one node, wherein the node is one of an input node, an output node, a ground node and a power supply node.

Optionally, in step 3) scoring the, or each, circuit configuration comprises applying a sub-score to aspects of the, or each, circuit configuration, and the sub-scores are weighted based on each aspect's contribution to the score of its associated circuit configuration.

Optionally, the aspects of the circuit configuration comprise the components and/or the connections and/or the components and their connections.

Optionally, in step 1) providing the first set of circuit configurations is dependent on adherence to constraints, and/or in step 4) providing the second set of circuit configurations is dependent on adherence to constraints.

Optionally, in step 4) providing the second set of circuit configurations comprises excluding from the second set of circuit configurations, circuit configurations having a score, as evaluated in step 3), that are below a threshold score.

Optionally, the method is a method of designing a circuit configuration of an analog circuit.

According to a second aspect of the disclosure there is provided a computer system comprising a module configured as an automated integrated circuit design tool comprising a circuit design system configured to: 1) provide a first set of circuit configurations comprising one or more circuit configurations, 2) simulate the, or each, circuit configuration of the first set of circuit configurations, 3) score the, or each, circuit configuration of the first set of circuit configurations based on a design specification and the simulation, or simulations, of step 2), and 4) provide a second set of circuit configurations comprising one or more circuit configurations that are dependent on the scores as determined in step 3).

It will be appreciated that the computer system of the second aspect may include features set out in the first aspect and can incorporate other features as described herein.

According to a third aspect of the disclosure there is provided a circuit implementing a circuit configuration designed using a method of designing the circuit configuration, comprising 1) provide a first set of circuit configurations comprising one or more circuit configurations, 2) simulate the, or each, circuit configuration of the first set of circuit configurations, 3) score the, or each, circuit configuration of the first set of circuit configurations based on a design specification and the simulation, or simulations, of step 2), and 4) provide a second set of circuit configurations comprising one or more circuit configurations that are dependent on the scores as determined in step 3).

It will be appreciated that the circuit of the third aspect may include features set out in the first aspect and can incorporate other features as described herein.

BRIEF DESCRIPTION OF THE DRAWINGS

The disclosure is described in further detail below by way of example and with reference to the accompanying drawings, in which:

FIG. 7 shows three episodes over which the method of FIG. 1 is applied;

DESCRIPTION

Figure 1:
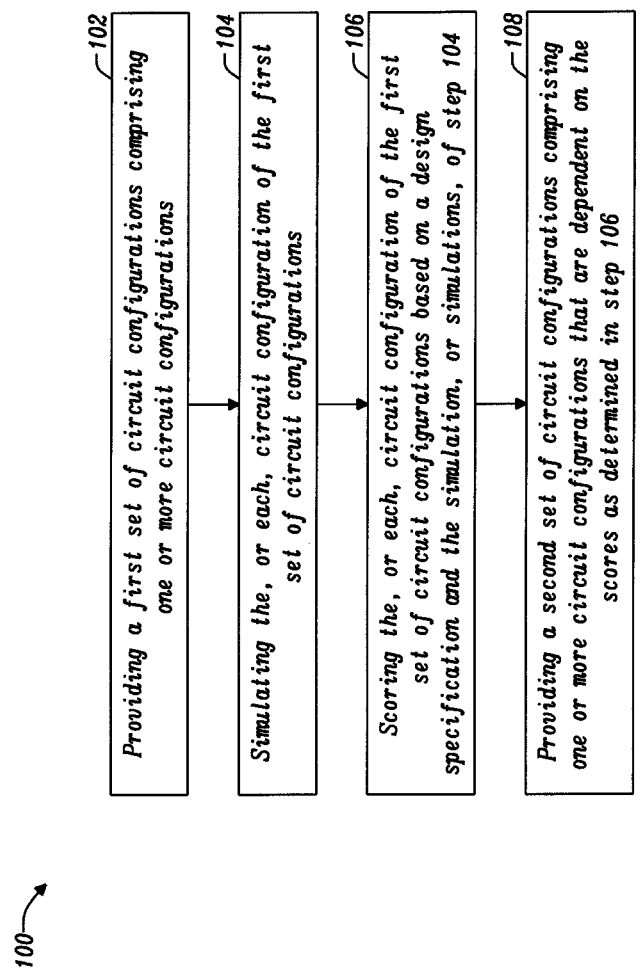
FIG. 1 is a flow chart of a method of designing a circuit configuration of a circuit in accordance with a first embodiment of the present disclosure.

FIG. 1 is a flow chart of a method 100 of designing a circuit configuration of a circuit in accordance with a first embodiment of the present disclosure. The method 100 may be a method of designing a circuit configuration of an analog circuit.

The method 100 comprises providing a first set of circuit configurations comprising one or more circuit configurations, at a step 102, simulating the, or each, circuit configuration of the first set of circuit configurations, at a step 104, scoring the, or each, circuit configuration of the first set of circuit configurations based on a design specification and the simulation, or simulations, of step 104, at a step 106, and providing a second set of circuit configurations comprising one or more circuit configurations that are dependent on the scores as determined in step 106, at a step 108.

The method 100 provides an automated and systematic way to explore and optimise the topology of analog circuits to meet a design objective. A system implementing the method 100 may be referred to as an agent, or specifically, a learning agent.

The design specification is a description of the property or properties that the circuit to be designed should meet. For example, the design specification may include a description of gain or bandwidth characteristics that the analog circuit should exhibit. Alternatively, or additionally, the design specification may include an upper limit on the number of transistors that the analog circuit should have (a transistor budget), or an upper limit on the area that the circuit should occupy on a chip. These properties may be represented numerically.

In summary, the design specification may comprise one or more circuit properties. Example circuit properties include a gain, a bandwidth, an input impedance, an output impedance, linearity objectives, transistor number and a circuit area. The agent applying the method 100 learns and designs a suitable circuit configuration by interacting with an environment based on a specific target objective or set of objectives as defined by the design specification. The environment refers to a system, such as a simulation testbench, that provides simulation results on a given circuit configuration generated by the agent and produces a reward when design objectives, defined by the design specification, are met. The reward corresponds to the scores as determined in step 106. In effect, the agent applying the method 100 iteratively searches for a circuit configuration that meets the design specification.

It will be appreciated that the circuit properties are not limited to the examples presented above. It is possible to distinguish between performance related properties or functional properties, and design constraint properties. For example, gain, bandwidth, impedance etc are performance-related properties that may be used to calculate the reward. The design constraint properties such as transistor count, power and area, may be used to prune the search tree and may not be considered as part of the reward calculation. It will be appreciated that the method of scoring is flexible and may be defined by a user to meet the requirements for the circuit design method, in accordance with the understanding of the skilled person.

In the present embodiment, scoring the circuit configurations, in the step 106 of the method 100 comprises the following steps: comparing each property of the design specification to each associated property of each circuit configuration as determined by the simulations of step 104 and applying a value to the score of each circuit configuration for each property of the design specification based on the comparison.

It will be appreciated that in a further embodiment the steps for scoring the circuit configurations may also be applied to a single circuit configuration.

Additionally, it will be appreciated that in a further embodiment, the design specification may comprise a single property that is compared with the associated property of the circuit configuration.

In a further embodiment, the method 100 comprises the additional steps of: simulating the circuit configurations of the second set of circuit configurations and scoring the circuit configurations of the second set based on the design specification and the simulations of the second set. It will be appreciated that the second set of circuit configurations may comprise only a single circuit configuration that will be simulated and scored as will be clear to the skilled person.

If the second set comprises circuit configurations present in the first set that already have a score, then the score of these circuit configurations may be updated for subsequent simulations.

The steps as described in the method 100 (of providing, simulating and scoring) may be applied repeatedly for subsequent circuit configurations until an end condition is met. The end condition may be, for example, when the number of sets of circuit configurations meets or exceeds a limit value, or when the score of one of the circuit configurations meets, or exceeds, a target value.

If the end condition is not met, the method 100 may further comprise providing an updated set of circuit configurations comprising one or more circuit configurations that are dependent on the scores as determined in the previous simulation step, simulating each circuit configuration of the updated set of circuit configurations, scoring each circuit configuration of the updated set of circuit configurations based on the design specification and the simulations of the updated set of circuit configurations. These steps may be repeated until the end condition is met.

Figure 2:
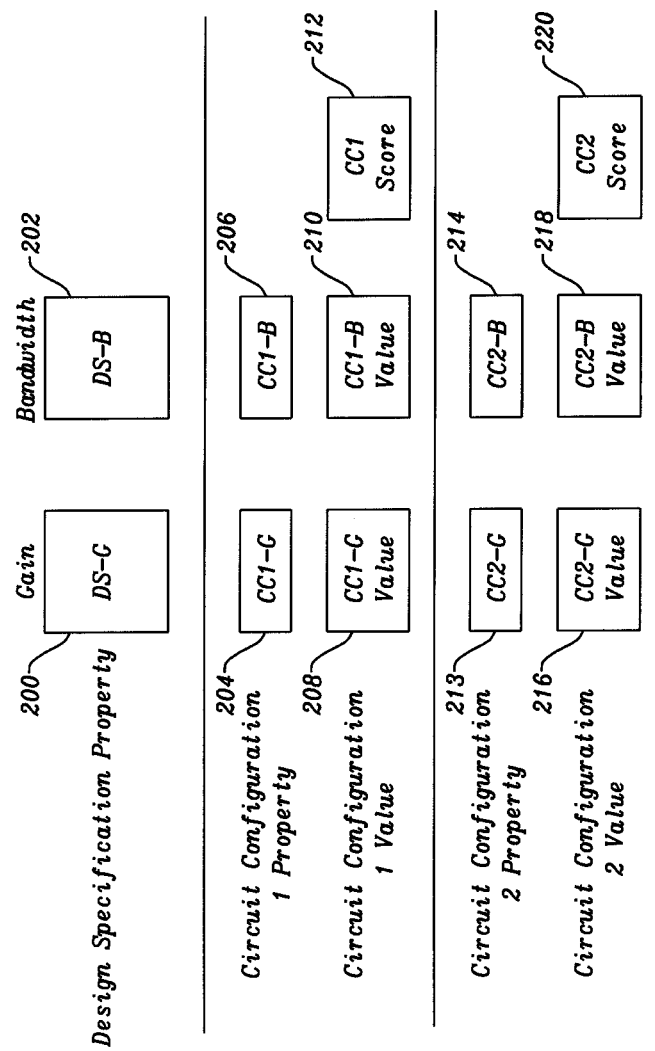
FIG. 2 is a schematic showing how a step of the method of FIG. 1 is applied.

FIG. 2 is a schematic showing how step 106 of the method 100 is applied in the present embodiment. In the present example the design specification comprises two properties, namely a gain 200 (also labelled DS-G) and a bandwidth 202 (also labelled DS-B). As discussed previously, the gain 200 and bandwidth 202 are target properties that the final version of the analog circuit should ideally exhibit. It will be appreciated that in further embodiments the design specification may comprise more than two properties.

In the present embodiment, the first set of circuit configurations comprises a single circuit configuration: a first circuit configuration.

To determine whether the first circuit configuration has the properties outlined in the design specification, the first circuit configuration is simulated at the step 104. In the present example, the simulation is used to evaluate a gain 204 (also labelled as CC1-G) and a bandwidth 206 (also labelled as CC1-B) of the first circuit configuration.

At step 106, the gain 200, being the target gain as outlined previously, is compared to the gain 204 of the first circuit configuration. A value 208 is calculated based on a comparison between the gain 200 and the gain 204. In the present example, the value 208 is representative of how closely the gain 204 of the simulated circuit configuration matches the gain 200 of the design specification. The value 208 may have a maximum value if the gains 200, 204 match, with decreasing values from the maximum value that are indicative of the degree to which the gains 200, 204 differ.

A value 210 is also determined based on a comparison between the bandwidths 202, 206 that is similar as described for the gains 200, 204.

The two values 208, 210 contribute to a score 212 for the first circuit configuration. The score 212 may be a linear combination of the two values 208, 210 with a weighting applied to each of the values 208, 210 depending on the relative importance of the gain 204 and the bandwidth 206 towards meeting the design objective as outlined in the design specification for the analog circuit.

Using the scoring information from step 106, there is provided a second set of circuit configurations as described at the step 108. In the present embodiment, the second set of circuit configurations comprises a single circuit configuration: a second circuit configuration.

In effect, the first circuit configuration is updated to provide an updated version of the first circuit configuration circuit configuration, the updated version of the first circuit configuration being the second circuit configuration.

The updating of the first circuit configuration to the second circuit configuration is informed by the score that has been applied. For example, a low score may indicate that the first circuit configuration has an insufficient gain and therefore the second circuit configuration can implement components that are targeted at increasing the gain. Alternatively, a high score may indicate that only minor adjustments are required to meet the design specifications.

A gain 213 and a bandwidth 214 of the second circuit configuration are shown in FIG. 2. These properties 213, 214 are also compared with their respective associated properties 200, 202 in the design specification to provide a value 216 and a value 218, which contribute to a score 220 of the second circuit configuration.

This procedure may be repeated for subsequent versions of the circuit configuration until an end condition is met.

It will be appreciated that the use of the terms "first" and "second" are not intended to be limiting beyond applying a sequential characteristic to the version of the circuit configuration. The circuit configuration is simulated then updated and the process may be repeated until a final version is arrived at, for fabrication of the analog circuit.

Returning to FIG. 1, a further embodiment of the method 100 may comprise a step prior to the step 102, where the first set of circuit configurations comprises a first circuit configuration, the step comprising receiving the first circuit configuration from a user or generating the first circuit configuration.

The user may provide an initial version of the circuit configuration that is already close to meeting the requirements set out in the design specification thereby further reducing design time. As such, in the present embodiment the first circuit configuration acts as a useful "starting point" for the design of the subsequent circuit configurations.

The end condition may be met when at least one of the following occurs: the number of sets of circuit configurations meets or exceeds a limit value; and the score of the circuit configuration meets, or exceeds, a target value. The target value may be dependent on the design objectives as outlined in the design specification.

The limit value may be equal to the component budget when, for each repetition, a single component is added to the circuit configuration and each set comprises only a single circuit configuration. The component budget may define an upper limit on the number of circuit components that may be included in the circuit configuration. The component budget may be a transistor budget, in which the transistor budget defines an upper limit on the number of transistors that may be included in the circuit configuration.

The end condition may also be met when other design constraints are met, such as circuit area being met or exceeded, or a peak value for power consumption being exceeded.

Each version of the circuit configuration may comprise a plurality of components; and a plurality of connections. Each connection can couple at least two components. In a further embodiment the circuit configuration may only comprise one component and/or one connection.

Components refer to electrical components that are typical in analog circuits and circuit design. For example, a component may comprise a node, a transistor, a current source, a voltage source, a resistor, an inductor, a capacitor or an amplifier, in addition to any other electrical component in accordance with the understanding of the skilled person. The node may, for example, be an input node, an output node, a ground node or a power supply node.

Figure 3B:
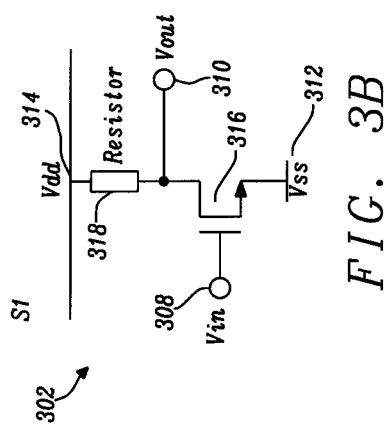
FIG. 3B is a schematic of a second circuit configuration.
Figure 3D:
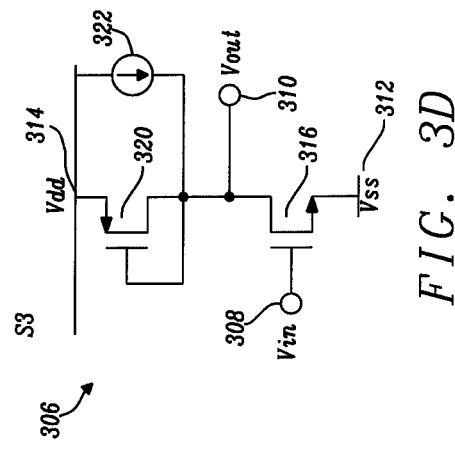
FIG. 3D is a schematic of a fourth circuit configuration.
Figure 3A:
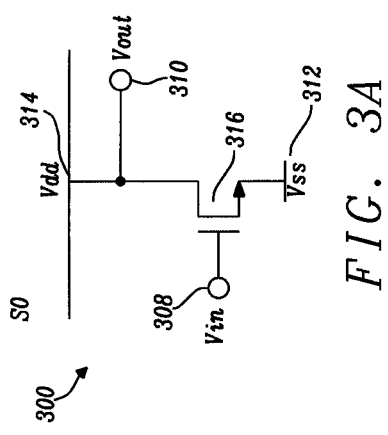
FIG. 3A is a schematic of a first circuit configuration.
Figure 3C:
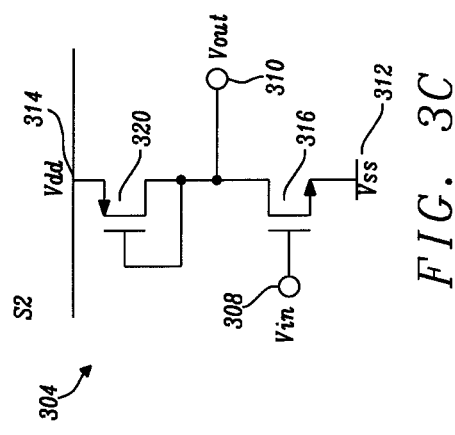
FIG. 3C is a schematic of a third circuit configuration.

FIG. 3A is a schematic of a circuit configuration 300, FIG. 3B is a schematic of a circuit configuration 302, FIG. 3C is a schematic of a circuit configuration 304 and FIG. 3D is a schematic of a circuit configuration 306.

The circuit configuration 300 comprises an input node 308 configured to receive an input voltage Vin, an output node 310 configured to provide an output voltage Vout, a ground node 312 coupled to a voltage Vss, a power supply node 314 coupled to a voltage Vdd and a transistor 316.

The circuit configurations 302, 304, 306 share common features with the circuit configuration 300 and common features are represented by common reference numerals/variables. The circuit configuration 302 further comprises a resistor 318, the circuit configuration 304 further comprises a transistor 320 and the circuit configuration 306 further comprises the transistor 320 and a current source 322.

In the following description, the design of an analog circuit with a given target objective as outlined in a design specification, is presented as a sequential Markov Decision Process (a tuple <S, A, R, P>).

"S" is a set of states. A state in this context is a circuit configuration, such as the circuit configurations 300, 302, 304, 306. The circuit configurations 300, 302, 304, 306 are examples of possible states that may be derived for a design objective of designing a single-ended common-source amplifier with a certain small-signal gain and output swing, as would be described in the design specification.

As the circuit is being designed, the state progresses from some "initial state" to a "terminal state" or to one of several "terminal states". A terminal state may be a circuit configuration where design objectives as outlined in the design specification are met. Alternatively a terminal state may correspond to a circuit configuration where the design objectives outlined in the design specification are not met but some other condition is met. For example, this other condition may be where one or more circuit constraints have been reached or exceeded, such as power, area or noise requirements. A terminal state refers to any circuit configuration meeting the requirements for the end condition as previously described.

The circuit configuration 300 may correspond to an initial version of the circuit configuration as provided by a user and as described previously. The circuit configuration 300 may be denoted by "S0" and comprises a single NMOS transistor (the transistor 316) comprising a common source and a drain shorted to the voltage Vdd.

The circuit configuration 302 is a subsequent state from the circuit configuration 300 and may be denoted by "S1". In updating the circuit configuration 300, the resistor 318 has been added to form the circuit configuration 302.

The circuit configuration 304 is also a subsequent state from the circuit configuration 300 and may be denoted by "S2". In updating the circuit configuration 300, the diode connected PMOS transistor (the transistor 320) has been added to form the circuit configuration 304.

The circuit configurations 302, 304 show two different updating options available when starting from the circuit configuration 300.

The circuit configuration 306 is a subsequent state from the circuit configuration 304 and may be denoted by "S3". In updating the circuit configuration 304, a parallel current source (the current source 322) has been coupled to the PMOS transistor (the transistor 320) to form the circuit configuration 306.

The circuit configurations 304, 306 (S2, S3) may be "successful terminal states" if the design objectives outlined in the design specification are met by these configurations. When a successful terminal state is reached, the end condition is met because the score of the circuit configuration will meet, or exceed, the target value.

"A" is a set of actions that cause a transition between any two states. For example, adding a transistor to an existing circuit configuration already containing a set of components is an action that causes transition to another state, for example from S0 to S2. The goal is to take an appropriate sequence of actions from an "initial state" to arrive at a "terminal state" where the design objective or objectives are met.

An action may be described by an ordered pair of an initial state and a next state (s_start, s_next) and represents one-step evolution of design towards its final goal, i.e. its terminal state. The terminal state is arrived at by tracing a number of actions (i.e. state transitions) from the initial state. The entire journey from the initial state to one of the terminal states may be referred to as an episode. Generally, an episode is the journey from the step 102 until the end condition is met.

There may be more than one successful terminal state because it is possible for multiple circuit configurations via multiple episodes to meet the same design objective.

As discussed previously, a terminal state is also reached when the transistor budget is exhausted (i.e. number of transistors (or components) in the design is equal to the maximum number allowed).

"R" is a reward. The reward may be a scalar number that is provided every time a state transition occurs. The reward corresponds to the score as previously defined and discussed.

An analog circuit is designed to achieve some design goals as outlined in the design specification. For example, an amplifier may be designed to achieve a certain combination of gain, bandwidth, output impedance, linearity etc. The reward is quantified as a scalar number, that can be derived from a linear of combinations of design objectives reflecting relative importance of each objective. For example, a reward function for a single-ended common source amplifier may be described by the following equation:

$$R = k_1 G + k_2 B + k_3 Z_{out} + \quad (1)$$

where R is the reward, $k_1$, $k_2$, $k_3$ are first, second and third coefficients, respectively, G is the gain, B is the bandwidth and $Z_{out}$ is the output impedance. The coefficients $k_1$, $k_2$, $k_3$ encode the relative importance of each of the attributes to the reward. The combination of the coefficient multiplied by the features provides the reward value for that feature. For example $k_1 G$ corresponds to the reward value attributed to the gain G.

Equations (1) describes the method for determining the score of a circuit configuration as discussed previously and present in FIG. 2. The weighting applied to the values as discussed previously is provided by the coefficients $k_1$, $k_2$, $k_3$.

A positive reward may be provided for meeting design objectives such as circuit gain, bandwidth, input/output impedance and linearity. These rewards can be large and can be deferred until the design objective is reached. This means the agent may see no reward until it reaches the end of a design evolution episode, but gets a large reward in the end, if design objectives are met.

Each transistor or circuit element adds a certain amount of circuit area, capacitive loading and other overheads to the circuit configuration. A negative reward can optionally be used to penalise certain design steps, such as implementation of large transistors or simply providing a negative reward for each transistor added. A negative reward may also be deferred.

The reward aspect of the method 100 guides the evolution of circuit configuration towards meeting the design objectives. The key features on how to determine the value of a reward for a given feature and property may be controlled by the user to guide design evolution and design objective.

"P" denotes the probability of a state transition. Not all states are possible to reach from a given circuit configuration. P is a sparse matrix of dimension |S|*|S| where, most of the entries are zeroes but some transitions are legal. The legality of a state transition from one circuit configuration to another may initially calculated based on an approximate model, as is discussed below. The sum of probabilities of all state transitions to be reached from a given state must add up to 1. P may be automatically generated from the exploration of state space.

In order to quickly arrive at an analog circuit meeting the design specification, an approximate model of the environment may initially be provided. The approximate model comprises rules/constraints that can reduce the number of circuit configurations that are considered.

In the step 102, providing the first set of circuit configurations may be dependent on adherence to constraints. In the step 108 providing the second set of circuit configurations may be dependent on adherence to constraints. In summary, in the steps 102 and/or 108, as discussed previously, providing sets of circuit configurations may be dependent on adherence to constraints, as may be defined by an approximate model.

Therefore, certain circuit configurations are "not allowed" and the sets of circuit configurations will not include to any of these circuit configurations that are not allowed. This acts to reduce the number of possible circuit configurations to be assessed (there is a reduction in the state space search tree for circuit configuration design exploration). The reduction in the number of circuit configurations that can be assessed can result in faster application of the method 100.

The approximate model constrains the number of circuit configurations to be searched in a state space and reduces wasteful effort. As an example of an approximate model, each transistor can be abstracted as a simple voltage controlled current source (gm×Vin) with large output impedance (ro), neglecting the body-bias effect.

A bare minimum "approximate" model may just provide the voltage headroom (drain-to-source voltage) required to keep a transistor in saturation so that number of transistors between any Vdd and Vss path can be constrained. The "validity" of a circuit configuration can be assessed, and this information can be used to "prune" the number of allowed circuit configurations (states) to search (and learn from) accordingly.

For example, if the model requires, say 0.1V drain to source voltage overdrive (the amount by which the drain source voltage Vds exceeds the gate source voltage minus the threshold voltage (Vgs−Vth)) to keep each transistor in saturation and the voltage Vdd is 1.5V, the number of transistors that can be stacked in any path from the voltage Vdd to the voltage Vss can be calculated and can be provided in the approximate model. Any circuit configurations having more than this number of transistors are excluded from consideration in application of the method 100. The approximate model may be considered as a set of technology specific rules.

Alternatively, the model may simply define any configuration that a user does or does not want to explore as part of the method 100. With this approximate model, there is in effect provided a list of allowed circuit configurations (states) and a state-transition matrix.

A "policy" may refer to the rules of topology evolution applied to the circuit configuration as part of the steps 102 and/or 108, as defined by the constraints. Initially, if an approximate model is provided, the policy, or policies, may be defined by the constraints provided by the approximate model.

In subsequent repetitions of the method 100, providing sequentially updated sets of circuit configurations, more accurate models can be provided by the simulation carried out in the step 104 of each iteration. This enables continuous updating of the P matrix and refinement of the policy, or policies, based on the contribution of each circuit configuration towards meeting the circuit objectives as outlined in the design specification and represented by the circuit configuration's score as determined in the step 106.

A given state (circuit configuration) can evolve to a plurality of states and each of these actions can initially be in agreement with a valid policy. Upon determining the reward for a given circuit configuration (its score), some policies are pruned, and others strengthened. Ultimately, the goal is to discover and follow policies that yield a functioning analog circuit having a performance close to, or meeting, the design specification. In summary, one of the goals of the agent in application of the method 100 may be to determine a policy that maximizes the cumulative reward as described in equation (1).

In the present example, we may assume that there is a policy having the constraint that only one component can be added or removed from a circuit in a single transition from one circuit configuration to another. Therefore, state S0 can evolve to state S1 in accordance with the policy. Similarly, the state S2 can evolve to the state S3. However, state S1 cannot transition to the state S3 directly as this would be in disagreement, or violation, with the policy, and not adhere to the constraint applied. The allowed policies are guided by the approximate model at least initially, before any learning experience begins by determining the rewards (the scores) for each circuit configuration.

In summary, from the initial version of the circuit configuration, the agent implementing the method 100, performs a forward tree search to explore many possible circuit configurations that are reachable from the initial version according to the policies defined by the approximate model. It then updates the score of each circuit configuration, based on the simulation.

The agent is a learning agent, in that it continuously learns from the score (the reward) received from the simulation step (an environment, which may be referred to as a simulation testbench) at each step of the evolution of the circuit configuration. As discussed previously, the scoring is based on how well the circuit configuration meets the design objectives as described in the design specification.

Figure 4B:
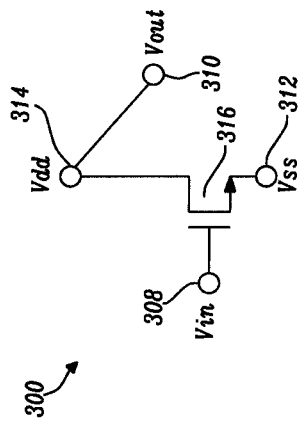
FIG. 4B is a schematic of the first circuit configuration.
Figure 4D:
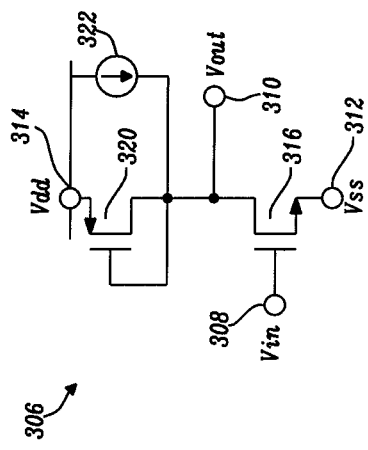
FIG. 4D is a schematic of a fourth circuit configuration.
Figure 4A:
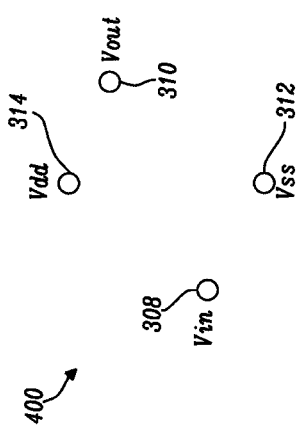
FIG. 4A is a schematic of a fifth circuit configuration.

FIG. 4A is a schematic of a circuit configuration 400 comprising four nodes 308, 310, 312, 314 for receiving voltages Vin, Vout, Vss, Vdd, respectively, and as defined previously. In the present example, the circuit configuration 400 is the initial version of the circuit configuration 400. It will be appreciated that the circuit configuration 400 is in effect a "blank slate" with no substantial circuit topology beyond the inclusion of the nodes 308, 310, 312, 314. It will be appreciated that in a further embodiment, a circuit configuration having a more detailed circuit topology may be provided as the initial version of the circuit configuration.

Figure 4C:
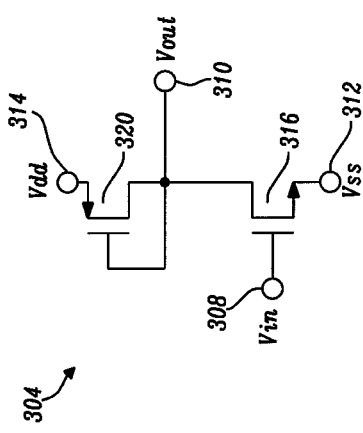
FIG. 4C is a schematic of a third circuit configuration.

FIG. 4B is a schematic of the circuit configuration 300 (S0), FIG. 4C is a schematic of the circuit configuration 304 (S2) and FIG. 4D is a schematic of the circuit configuration 306 (S3). Common features between figures are represented by common reference numerals/variables.

FIGS. 4A-D illustrates the concept of states and their transitions in the context of analog design exploration as carried out by application of the method 100.

The circuit configuration evolves from its initial state (in FIG. 4A) to its terminal state (in FIG. 4D). Every time a new component is added (an 'action' on a starting state) the circuit configuration reaches a new 'state'.

When the circuit configuration hits a terminal state that meets the design specification, a large reward (score) is generated. This may occur, for example when the circuit configuration 306 as shown in FIG. 4D is reached. In the present embodiment the aim is to maximise the score, thereby indicating that the design specification has been met, by correctly choosing the intermediate states.

With reference to the method 100 as shown in FIG. 1, and applied to the circuit configurations shown in FIG. 4A-D, the initial version of the circuit configuration that is provided corresponds to the circuit configuration 400, which is part of the first set of circuit configurations, as shown in FIG. 4A.

At the step 104, the circuit configuration 400 is simulated to determine how well it meets the design specification. This is reflected in its score, as evaluated in the step 106. The circuit configuration 400 is then updated to provide the circuit configuration 300, which is part of the second set of circuit configurations. Updating the circuit configuration adheres to the constraint as defined previously, where only one component can be added or removed from a circuit in a single transition from one circuit configuration to another.

Updated sets of circuit configurations are provided until the end condition is met. In the present example, the end condition is met when the circuit configuration 306, as shown in FIG. 4D is reached. The end condition may be met, for example, because the circuit configuration 306 has a score as determined in step 106 that exceeds a threshold value (for example, the target value as discussed previously) and therefore indicates that the design specification has been met, or the circuit configuration 306 is sufficiently close to the design specification to halt the process. An assessment of whether the circuit configuration meets the design specification or is sufficiently close to the design specification may be made by comparing the score to the target value as discussed previously. For example, if the target value is representative of a required score to meet the circuit configuration, considering the end condition as being met when the score is within a range of this target value can be suitable for determining when the circuit configuration is sufficiently close to meeting the design specification.

In a further embodiment, the step 108 of the method 100 may comprise excluding from the second set of circuit configurations, circuit configurations having a score, as evaluated in 106, that are below a threshold score. This step may also be applied for further updated sets of circuit configurations beyond the second set of circuit configurations.

Any circuit configurations falling below a threshold score, and therefore not being close to meeting the design configuration can be excluded from consideration, thereby further reducing the state space and increasing the efficiency of the method 100.

The method 100 may further comprise updating the score of the circuit configuration, if the circuit configuration has already been scored on a previous iteration.

Figure 5:
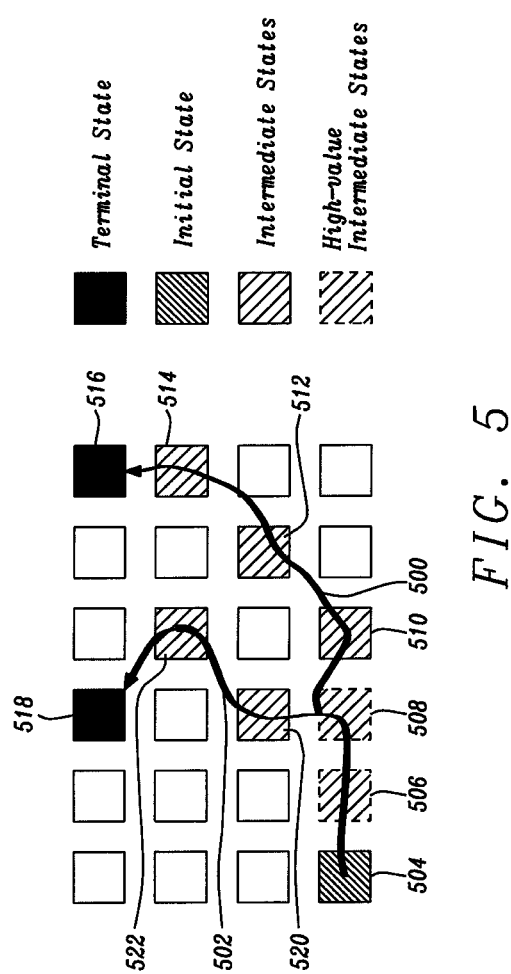
FIG. 5 is a schematic illustrating the evolution of a circuit configuration using the method of FIG. 1.

FIG. 5 is a schematic illustrating the evolution of a circuit configuration using the method 100, and demonstrating reaching two different terminal states that are representative of two circuit configurations being sufficiently close to, or meeting, the design specification.

Both iterations start at the same initial state, with the same initial version of the circuit configuration, as denoted by the reference numeral 504. Adjacent squares denote circuit configurations reachable from the present circuit configuration. It will be appreciated that the distance between any two given squares or their relative locations in the drawing has no physical meaning. A given circuit configuration can be reached from a limited number of other circuit configurations by adding transistors (or components).

With reference to FIG. 5, one embodiment, may be such that the first set of circuit configurations comprises the initial state 504 (step 102). The initial state 504 is simulated (step 104), resulting in a score for the initial state 504 (step 106), results in the progression to the second state of circuit configurations comprising an intermediate state 506 (step 108).

The steps of the method 100 are then repeated until an end condition is met. This results in progression from the intermediate state 508 to an intermediate state 510, then from the intermediate state 510 to the intermediate state 512 and from the intermediate state 512 to an intermediate state 514 and from the intermediate state 514 to a terminal state 516. As discussed previously, the end condition is met at the terminal state.

In the present embodiment, the method 100 is then repeated and progresses from the state 504, to the state 506 to the state 520 to the state 522 until reaching the terminal state 518 where the end condition is met. The scores may be updated cumulatively between applications of the method 100 and therefore the repeated simulating of the states 504, 506 and 508 can lead to their scores being updated.

The intermediate states 506, 508 are high value intermediate states. This means that the state has a sufficiently high score for it to be indicative that the evolution of the circuit configuration is progressing in the right direction to achieve a terminal state quickly and/or efficiently. The high value states are valued because the participated in multiple episodes that eventually led to successful terminal states where the design objectives outlined in the design specification were met.

The terminal states 516, 518 correspond to circuit configurations that are sufficiently close to, or meeting, the design specification.

In an alternative embodiment, and with reference to FIG. 5, the first set of circuit configurations comprises the states 504, 506, 508, 510, 512, 514, 516 (the step 102). Each of the states are simulated (the step 104) to provide scores for each of these states (the step 106). The second set of circuit configurations comprising the states 504, 506, 508, 520, 522, 518 are dependent on the scores determined for the first set of circuit configurations (the step 108).

In the present embodiment, the method 100 further comprises, in step 102 providing the first set of circuit configurations comprises providing a first circuit configurations (state 504) and sequentially updating from the first circuit configuration to provide further circuit configurations (506, 508, 510, 512, 514, 516) until the end condition is met. In this case the end condition is met because the terminal state is reached (state 516).

The end condition may correspond to the sequential updating from the first circuit configuration exceeding a limit of sequential updates or if the score of one of the circuit configurations meets, or exceeds, a target value.

The path followed for the second set of circuit configurations is informed by the scores for the first set of circuit configurations. The circuit configurations of the second set passes through the same high value intermediate states 506, 508 as for the first set and reaches a terminal state 518 via the states 506, 508, 520 and 522.

Therefore, in the present embodiment, the method 100 further comprises, in step 108 providing the second set of circuit configurations comprises providing a second circuit configuration (state 504) and sequentially updating from the second circuit configuration to provide further circuit configurations (506, 508, 520, 522, 518) until the end condition is met. In this case the end condition is met because the terminal state is reached (state 518). The sequential updating in the second set is dependent on the scores of the circuit configurations of the first set.

The end condition may correspond to the sequential updating from the second circuit configuration exceeding a limit of sequential updates or if the score of one of the circuit configurations meets, or exceeds, a target value.

If the design objectives are met in the terminal states 516, 518 then the corresponding circuit configurations will attain a high, or maximum, score.

In a further embodiment, the method 100 may comprise, in step 106, applying a sub-score to aspects of the circuit configuration, where the sub-scores are weighted based on each aspect's contribution to the score of the circuit configuration. The aspects of the circuit configuration that contribute to the score may comprise any one of, or combination of: the components, the connections, and the components and their associated connections. The connection or connections associated with a given component may be described by a single parameters or group of parameters defined as the "connectivity" or "connectivity information" of that component.

Updating the score of the circuit configuration, if the circuit configuration has already been scored on a previous iteration may comprise updating the sub-scores.

Each component may have its type, attributes and connections encoded in a binary format. The circuit configuration may comprise a linear combination of encoded components. A linear combination of components allows the "value" of each circuit configuration to be decomposed into the sub-scores of each of the components. This also allows a prediction of the value of hitherto unvisited state from a linear combination of sub-scores of components that appear in that state.

Encoding the circuit configurations in the binary format enables systematic and efficient learning of the value of a circuit component towards achieving a design objective as defined by the sub-scores and the scores.

Each component is independently encoded by its type, attributes and connectivity information in a compact fixed-length binary format to enable efficient application of the method 100 and storage of data. Encoding allows reuse of components and connectivity information between multiple circuit configurations across multiple applications of the method 100. This allows any circuit configuration to be broken down to individual units drawn from a common pool of components. In any given circuit configuration (state), a given component is either present or absent. This allows the 'value' of the state to be assigned to the components present in that state. The components that appear in many high-value states will see their sub-scores improved as more and more episodes are experienced.

A circuit configuration may be built from a linear combination of a collection of encoded components. This allows the sub-scores to be distributed to each component efficiently depending on presence or absence of a component in a given circuit configuration. Additionally, this allows efficient learning by decomposition and attribution of scores among circuit components and reconstruction of the score of a new circuit configuration.

The prior art does not attribute design failure or success to individual analog components, thereby wasting a lot of computer resources.

A circuit component may be encoded as shown in Table 1:

TABLE 1

| Type of Device | Number of Terminals | Encoding (example) |
|---|---|---|
| NMOS | 3 | 8'b0000_0000 |
| PMOS | 3 | 8'b0000_0001 |
| Current Source | 1 | 8'b0000_0010 |
| Voltage Source | 1 | 8'b0000_0011 |
| Resistor | 2 | 8'b0000_0100 |
| Inductor | 2 | 8'b0000_0101 |

TABLE 1-continued

| Type of Device | Number of Terminals | Encoding (example) |
| --- | --- | --- |
| Capacitor | 2 | 8'b0000_0110 |
| Input | 1 | 8'b0001_0000 |
| Output | 1 | 8'b0001_0001 |

In the present example, 8 bits are used to represent each component, however further embodiments may use less or more bits. 8-bit encoding is used to make parsing easier from a hexadecimal representation of data. More compact forms of representation are possible and may be implemented in accordance with the understanding of the skilled person.

4 fields, each 8 bits wide may be associated with each circuit component to indicate its connectivity. Although it is possible to provide up to 4 terminals using 4 bytes, only lower bytes are used for a specific circuit component. This allows up to 256 different nodes to be coded.

For example, if a transistor is connected to 3 terminals (Drain, Gate, Source) and has node ID's 7, 9 and 10 associated with the drain, gate and source, respectively, it may be encoded with 4 bytes as shown in Table 2

TABLE 2

| Byte 4 (Unused) | Byte 2 (Drain) | Byte 1 (Gate) | Byte 0 (Source) |
| --- | --- | --- | --- |
| 32'b xxxxxxxx | 00000111 | 00001001 | 00001010 |

A similar encoding scheme can be used for 2-terminal and 1-terminal devices as listed in Table 1.

Attributes of a component can be encoded as follows. Attributes may be widths and lengths of transistors, current/voltage values for current and voltage sources and unused for inputs and outputs. Width and lengths of transistors in micro-meters or as multiples of minimum widths and lengths may be encoded in 2 fields of 8 bits each. For example, a transistor with a length, L=2Lmin and a width, W=4×Wmin, where Lmin is the minimum length and Wmin is the minimum width, may be encoded as shown in Table 3.

TABLE 3

| Byte 1 (W/Wmin) | Byte 0 (L/Lmin) |
| --- | --- |
| 16'b 00000100 | 00000010 |

Based on the above schemes shown in Tables 1, 2 and 3, each circuit component may be represented by seven bytes. Once circuit components are encoded, any circuit configuration may be represented using the convention as described.

Figure 6:
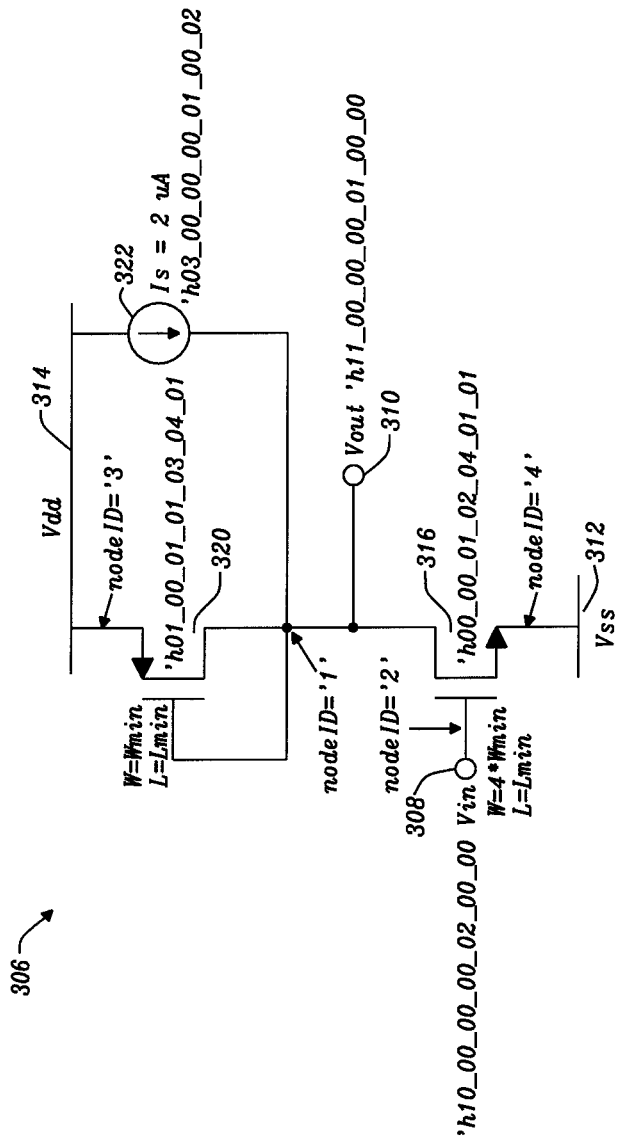
FIG. 6 is a schematic of the fourth circuit configuration demonstrating an encoding method.

FIG. 6 is a schematic of the circuit configuration 306 demonstrating how it may be encoded using the convention as described.

The circuit configuration 306 may be encoded as follows: 'h_01_00_01_01_03_04_01_03_00_00_00_01_00_02_ 11_00_00_00_01_00_00_10_00_00_00_02_00_00_00_ 00_01_02_04_01_01. It will be appreciated that other encoding schemes may be applied, in accordance with the understanding of the skilled person.

Note that node ID's and the order in which a component can occur in the binary encoding of the circuit configuration 306 can change without altering the basic topology of the circuit configuration 306.

Therefore, it is desirable that a method to uniquify circuit topologies is implemented to detect if two circuit configurations in the encoded format have exactly identical topologies. For example, there may simply be different node ID's but with width/length and other attributes the same between circuit configurations.

If the two circuit configurations are identical, then they are mapped to the same state encoding. This is to avoid aliasing in the encoding, where two essentially identical state map to two different encodings.

If the two circuit configurations differ and belong to two different states then a transition between the two circuit configurations is guided by the entries the probability transition matrix P and some deterministic policy.

Each component of the circuit configuration (such as an NMOS or PMOS transistor connected between two nodes) contributes towards a feature in making up the total description of the circuit configuration. Encoding a consistent mechanism for describing each component allows a circuit configuration to be described as a linear combination of features. Any circuit configuration can be constructed from a linear combination of components (simply a string of ones and zeros depending on whether a certain component is present or absent in that configuration). Since these features are independent (i.e. presence of a transistor between two nodes is a feature that is independent of another transistor connected between two other nodes), it allows efficient learning and attribution of value functions to individual components and states as the design evolves through various states. In the circuit configurations 306 as present in FIG. 6, the transistor 320 is a PMOS transistor and is encoded as: 'h01_00_01_01_03_04_01.

Description of a circuit configuration by a combination of linear basis functions that are independent of each other allows any function approximator to learn the score of each circuit configuration to learn and generalise. By encoding a circuit configuration as above, we have the flexibility to apply gradient descent method for score function learning (Barto, A., & Sutton, R. S. (1998). Reinforcement Learning: An Introduction. Cambridge, Mass.: The MIT Press).

A function approximation, such a neural network, is an alternative to a table-lookup of component values. For very large circuit configurations, the number of possible components and their associated scores can be very large and a table-lookup may be inefficient from a storage standpoint. In that case, we can approximate the table by a function (such as a neural network). In such a function approximator, the inputs are component or state "encodings" and the outputs are "values". One can then use the function approximator instead of a table-lookup. Use of a function approximated means that the retrieval of the value of a circuit configuration (state) can be faster than the table look-up.

Before simulating a circuit configuration, as described for step 104, the agent (being the system implementing the method 100) in effect plans as to how to proceed forward from the 'initial state' to any subsequent states. To make this happen, the agent may use the approximate model and a maximum length of each iteration provided by the user. The maximum length of each iteration represents a budget of maximum number of components that user wants to expend to realise the functionality of an analog circuit as described by the design specification. As such the maximum length of each iteration may be related to the upper limit of the size of the circuit configuration.

Based on the approximate model and a maximum length of each iteration provided, the agent implementing the method 100 will generate valid next states from the current state and evaluate the objective function, where the objective function is the score as defined previously. The approximate model can include, for example voltage headroom required for each component added. It can also implement the transconductance (gm) model of the MOSFET to build a first-order voltage-controlled model of the MOSFET's.

The more complex the approximate model is, the less exploration will be done by the learning agent implementing the method 100, as the search tree of potential circuit configurations will in effect be extensively pruned. By "pruned", it is meant that the potential paths for one circuit configuration to transition into another is reduced due to constraints that have been applied by the approximate model. The simpler the approximate mode is, the more the learning agent will explore non-standard circuit configurations and will discover new circuit configurations, but the search tree will also have more branches to explore.

There is trade-off between the complexity of the "approximate model" and the design search space. A more complex model is more restrictive and therefore reduces the search tree. A simpler model, on the other hand, creates a larger search tree.

The learning agent "learns" the components and the connectivity patterns that accumulate the most value towards achieving a design objective as defined by the design specification. The agent continuously narrows the state-space search around top-ranking circuit configurations that have accumulated most values. By reducing the search area based on accumulated values as described by the scores, the agent arrives at good design candidates that can meet the design objectives defined by the design specification.

The end condition as discussed previously may correspond to one of the following events happens: the allowed maximum length of the iteration is reached, or a circuit configuration is reached where no progress can be made because the voltage headroom is exhausted or some other criteria that the approximate model suggests cannot be met any more, or a successful terminal state is reached where circuit configuration meets the objective function, as the score applied to the terminal state circuit configuration is sufficiently high to indicate that the design specification is met within a tolerance.

At the end of the application of the method 100, the objective function, as defined by the design specification, is either met or not met. Regardless, the scores of each circuit configuration explored within that iteration have been evaluated. The score of each circuit configuration is a measure of how closely the circuit configuration meets the requirements outlined in the design specification.

An example of application of the method 100 will now be presented. The episodes are described with reference to the circuit configurations presented in FIG. 3A-D. The first episode comprises a progression from S0 to S1 to S2. FIG. 7 shows each of the three episodes (Episodes 1 to 3) as is described below.

In the present example, the first episode relates to the first set of circuit configurations (S0, S1, S2), the second episode relates to the second set of circuit configurations (S0, S1, S3) and the third episode relates to a third set of circuit configurations (S0, S1, S2).

When transitioning from S0 to S1, a transistor is added by the design objective is not met. Therefore, a negative reward of −1 is applied. When transitioning from S1 to S2, again a transistor is added and the design objective is not met. Therefore, a negative reward of −1 is applied. The cumulative reward for S0 is 0 because it does not meet the requirements. The cumulative reward for S1 is −1 because it does not meet the requirements and the addition of a transistor is a negative reward. The cumulative reward for S2 is −2, for the same reasons as S1. The first episode is terminated because the end condition is met as the voltage headroom is exhausted. Therefore S2 is the terminal state, but is not a successful terminal state.

Addition of a transistor adds area and other overhead. This is modelled by a negative reward in the present example. It is up to the user to define whether (or how much) to penalise for each extra transistor added in the design. In the present example, a reward of −1 is provided for adding a transistor, however it will be appreciated that in further embodiments other values may be used to penalise the addition of a transistor.

In the present example, application of the score (step 106) to each of the circuit configurations (S0, S1, S2) is deferred until the end of the episode. Therefore the step 108 occurs after the end condition is met and the scores do not inform the updating of circuit configurations within the first set.

Therefore, in the present embodiment, in effect, initially circuit configurations are generated randomly (with states only obeying the "approximate model" if provided). As such updating from S0 to S1 and from S1 to S2 is random and not informed by scoring that has been applied, as in this case the scores are not applied until the end of the episode. In subsequent episodes, as scores are applied to the states, the updating is informed by the scores acquired at the end of previous episodes.

In summary, state exploration is initially random but gets refined (i.e. prunes the search space) after some reward is experienced through the deferred scoring.

It will be appreciated that in further embodiments, as described previously, the scoring (step 106) and providing (step 108) may occur within each episode and not be spread across multiple episodes as is the case with deferred scoring.

Returning to the present example, the deferred scoring may apply a score at the end of an episode, based on the earlier scores (the rewards) acquired throughout the episode. This score may be defined using the following equation:

$$\mathrm{Val}(Sn)=a\times(W)+\mathrm{Val}(Sn_{m-1}) \quad (1)$$

where Val(Sn) is the present score for the state Sn, where n is an integer denoting the state number, a is a learning rate factor, W is a weighted average of the cumulative reward from the present state to the terminal state, and Val($Sn_{m-1}$) is the previous score of the state Sn.

Initially all scores Val($Sn_{m-1}$) are set to zero as is used for the first episode. Assuming a learning rate a=0.01, the scores for each of the states S0, S1, S2 at the end of the first episode are as follows:

$$\mathrm{Val}(S2)=0.01\times(-1)+0=-0.01 \quad (2)$$

$$\mathrm{Val}(S1)=0.01\times(0.5(-2)+0.5(-1))+0=-0.015 \quad (3)$$

$$\mathrm{Val}(S0)=0.01\times(0.33(-3)+0.33(-2)+0.33(-1))+0=-0.02 \quad (4)$$

In this example equal weights have been given to each of the negative rewards whilst adding them up (cumulative reward) but we can also attach a discounting weight, to de-emphasize contributions from states further from a given state.

Subsequent episodes will have S0=−0.02, S1=−0.015 and S2=−0.01 as initial conditions, as were determined using equations (2), (3) and (4).

In the second episode, progressing from S0 to S1 then from S1 to S3 the cumulative rewards are as follows: S0=0;

S1=−2; and S3=110. S3 gets a larger reward because it achieves the design objectives outlined in the design specification.

For the second episode, the scores determined at the end of the episode are as follows (assuming initial state values equal to zero).

$$Val(S3)=0.01\times(+100)+0=1 \quad (5)$$

$$Val(S1)=0.01\times(0.5(+99)+0.5(+100))+0=0.995 \quad (6)$$

$$Val(S0)=0.1\times(0.33(98)+(0.33(99)+0.33(100))+0=0.99 \quad (7)$$

In the present example, the idea is that when a high-reward state is reached, all states that lead to that state receive a part of that reward. The intermediate states that participate in multiple episodes that hit high-reward terminal states will see their value accumulate (increase) faster than other states, as more and more episodes are run.

It will be appreciated that normally initial state values will be zero only at the very beginning before any episode is started (that include a given state). Once a state is visited at least once, the initial value will generally be a non-zero number.

In the third episode, progressing from S0 to S1, then from S1 to S2 the cumulative rewards are as follows: S0=0; S1=−3; S2=48. The scores determined at the end of the episodes are as follows: Val(S2)=0.05; Val(S1)=0.0495; Val(S0)=0.049.

It will be appreciated that the exact reward number here is arbitrary for the purpose of this illustration. A reward of +50 means that the design objective is partially achieved (for example you wanted a gain of 250 but may be 125). The user may define how to calculate the reward. It may be the case, that the minimum gain you want is 200 so the gain of 125 is insufficient and may be assigned a reward of 0 instead of +50 in another application.

Once each of the scores associated with each of the circuit configurations begins to converge to a value, within a user defined range, an optimal policy can be formulated from the scores to identify the most promising circuit configurations for meeting the design specification.

From any circuit configuration, one can look at the neighbouring reachable circuit configurations and choose an action which is likely to have the greatest increase in score. One can then repeat the same process for the next circuit configuration until a terminal state is reached or maximum episode length is reached.

The higher scores associated with certain circuit configurations also incentivises the agent to explore more circuit configurations that can be reached from these circuit configurations to explore interesting and new topologies to achieve the same design objective.

Figure 8:
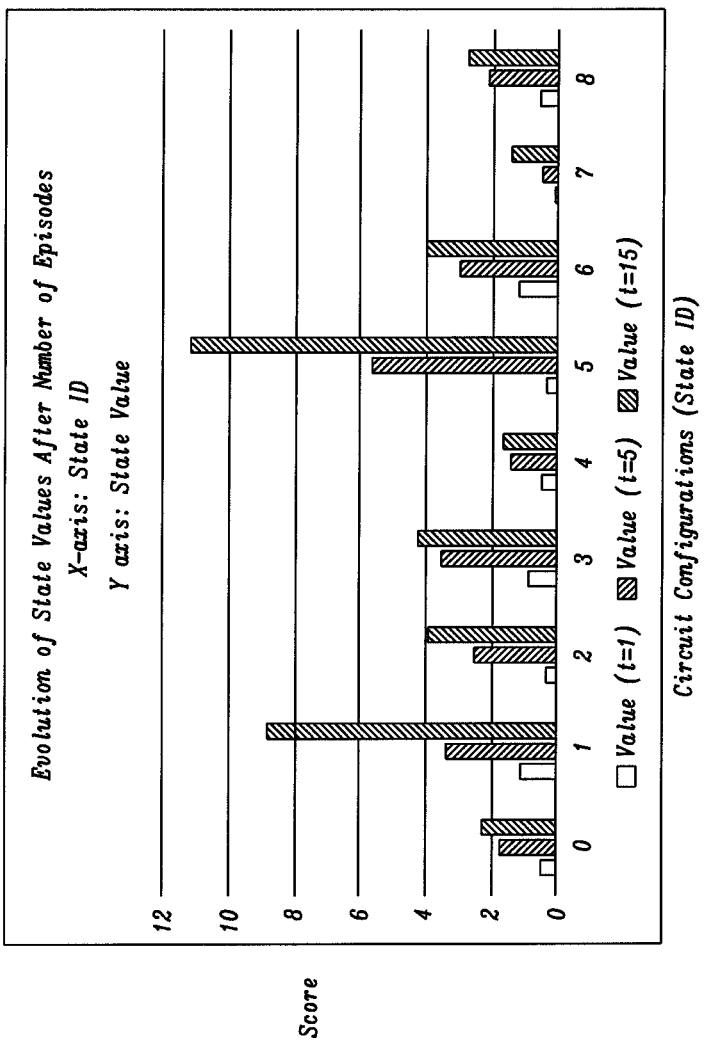
FIG. 8 is a graph showing how the scores of circuit configurations can be updated and evolve over time.

FIG. 8 is a graph showing how the scores of circuit configurations can be updated and evolve over time. The y-axis shows the score rewarded to each circuit configuration and the x-axis shows eight different circuit configurations distinguished by their unique state IDs (1 to 8). For each circuit configuration, the score is shown after one episode, after five episodes and after fifteen episodes. As discussed previously, an episode is the journey from the step 102 of the method 100 until the end condition is met. Through iteration of the method 100 multiple episodes are run. "t" denotes the number of episodes that have been completed for a given score.

From FIG. 8, it can be seen that the circuit configurations having state IDs one and five accumulate larger values relative to other states as more episodes are run. The evolution of scores shows that these circuit configurations are more influential to create new promising circuit topologies that meet the design specification requirements. Thus, the focus is shifted to these states and they serve as bases to do additional state exploration to arrive at promising new topologies within the given transistor budget (i.e. maximum length of the episode).

Figure 9:
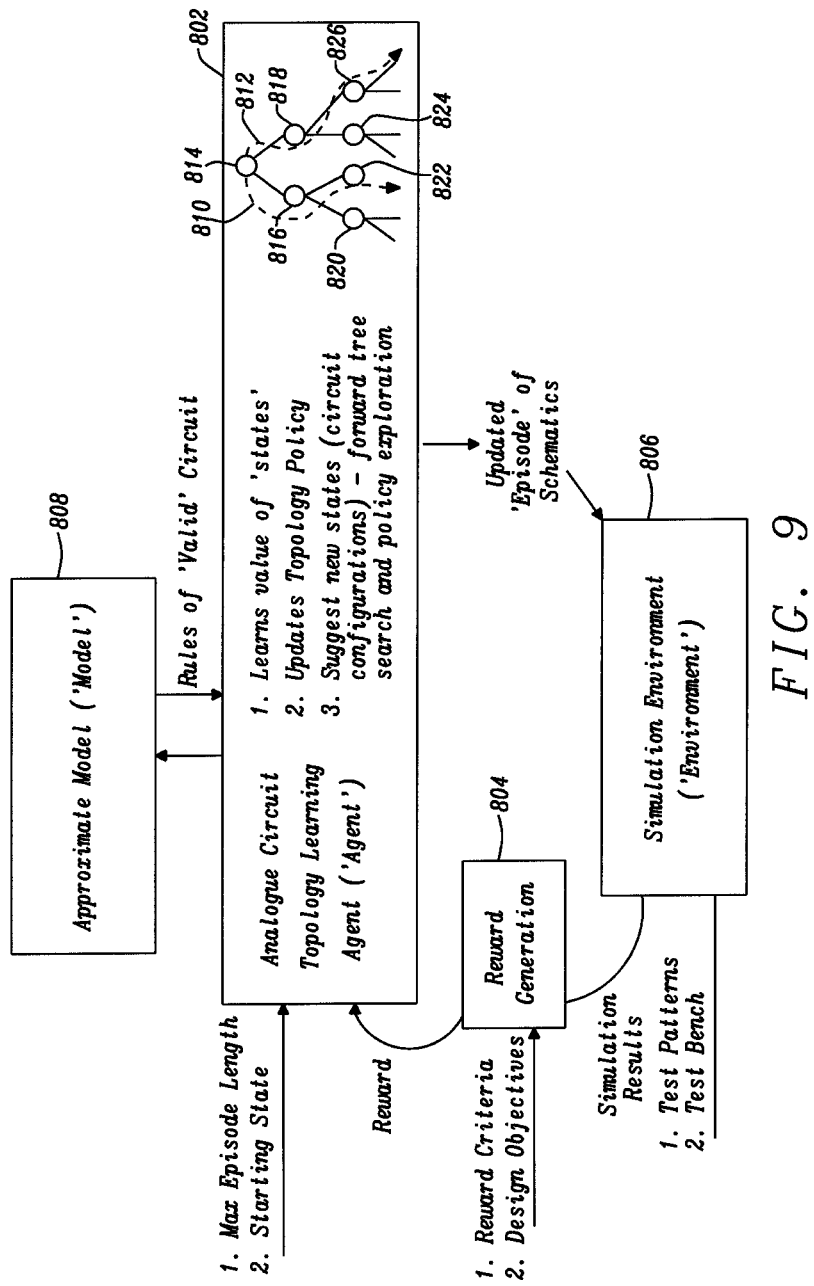
FIG. 9 is a schematic of a system for implementing the method of FIG. 1.

FIG. 9 is a schematic of a system 800 for implementing the method 100. The system 800 comprises a learning agent 802, a reward generation component 804 providing the scores of the step 106 and a simulation environment 806 that is used to simulate the circuit configuration at the step 104.

In FIG. 9 the simulation environment 806 and the reward generation component 804 are shown as separate to the learning agent 802, although it will be appreciated that the system 800 itself may be referred to as the agent as discussed previously where the agent is used to implement the steps of the method 100.

The system 800 comprises an approximate model 808, corresponding to the approximate model as discussed previously.

In the present embodiment, the approximate model 808 provides the rules/constraints to the agent 802. The agent 802 learns the scores of each circuit configuration, updates the policy accordingly and suggests new circuit configurations using a forward tree search and policy exploration. An updated circuit configuration is provided to the simulation environment 806 which simulates the circuit configuration. The results of the simulation are passed to the reward generation component 804 which calculates a score based on the design specification and the reward criteria. The score is provided to the agent 802 from the reward generation component 804 and the process is repeated.

In the present embodiment, using the score that it receives from the reward generation component 804, the agent 802 decides on an optimum next course of action i.e. how to modify the circuit configuration to get a maximum cumulative reward and tries to arrive at a good solution to meet design objectives within the given constraints.

A search tree illustrates two paths 810, 812 taken by the agent across two iterations of the method 100. The search tree comprises seven circuit configurations 814 to 826. The path 810 progresses from circuit configuration 814 to 816 to 822. Based on the scores evaluated in a first iteration, the path 812 progresses from circuit configuration 814 to 818 to 826. The paths 810, 812 will progress further until a terminal state is reached, as discussed previously.

It will be appreciated that the search tree is for illustrative purposes only and in a practical implementation, the number of search paths may only be limited by the circuit configurations allowed by the approximate model.

Figure 10A:
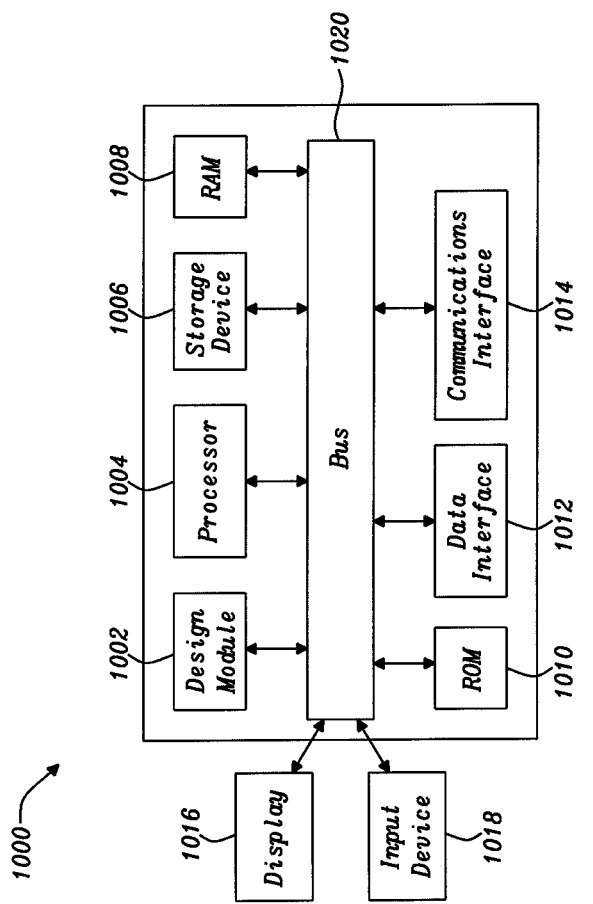
FIG. 10A is a schematic of a computer system which comprises specially modified components for carrying out the methods of this disclosure, in accordance with a second embodiment of the present disclosure.

FIG. 10A depicts a computer system 1000 which comprises specially modified components for carrying out the methods of the present disclosure, in accordance with a second embodiment of the present disclosure. The computer system 1000 comprises a module 1002 which is configured as an automated integrated circuit design tool comprising a circuit design system configured to implement the methods as described herein.

The computer system 1000 may comprise a processor 1004, a storage device 1006, RAM 1008, ROM 1010, a data interface 1012, a communications interface 1014, a display 1016, and an input device 1018. The computer system 1000 may comprise a bus 1020 to enable communication between the different components.

The computer system 1000 may be configured to load an application. The instructions provided by the application may be carried out by the processor 1004. The application may be the automated integrated circuit design tool comprising the circuit design system.

A user may interact with the computer system 1000 using the display 1016 and the input device 1018 to instruct the computer system 1000 to implement the methods of the present disclosure in the design of a circuit, such as an analog circuit.

Figure 10B:
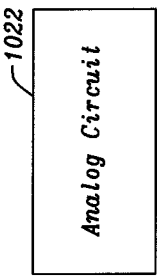
FIG. 10B shows a schematic of a circuit, specifically an analog circuit, in accordance with a third embodiment of the present disclosure.

FIG. 10B shows a schematic of a circuit 1022, specifically an analog circuit, in accordance with a third embodiment of the present disclosure. The circuit 1022 implements a circuit configuration designed using the methods as described herein.

It will be appreciated that further embodiments of the present disclosure may comprise application of the methods described herein to design a digital circuit, rather than an analog circuit.

The methods described herein provides a systematic process of learning from circuit topologies that either succeeded or failed to meet the criteria outlined in the design specification. The number of simulations may be reduced when compared with known processes by estimating the "value" of a circuit configuration through its score and/or the value of the components through their sub-scores as discussed previously. Circuit configurations are explored intelligently as the agent applying the method 100 learns the most valuable topologies with each iteration of the method 100. This reduces random topology exploration when compared to know methods, thereby saving on computation workload in designing new circuit configurations.

Ultimately application of the method 100 can reduce the time taken for a circuit designer to adopt a new process technology as the method 100 can be applied to automatically explore the constraints, limitations and advantages of a new technology through automated, intelligent circuit design. Additionally, there is a reduction in the time taken for a circuit design to design a new circuit configuration when compared with conventional methods and the circuit configuration can meet certain circuit requirements as defined by the design specification such as transistor area/budget.

The method discloses herein provides an efficient (as opposed to a brute force) method, using a guided search method for exploring the design configuration space by application of rules and/or constraints. Additionally, the state encoding method described previously provides an efficient way to implement the method.

The improvement over prior art is that the prior art only takes decisions after an entire population of new circuit configurations are constructed (Jiang, Y. (2009). Automated analog circuit design using Genetic Algorithms. Hong Kong, China: 3rd International Conference on Anti-counterfeiting, Security, and Identification in Communication), throwing away valuable learning from the circuit configurations that did not meet the design specification. The prior art methods also do not analyse the values (described herein is the sub-scores and their weightings) of each component and its connectivities towards meeting the design specification.

Various improvements and modifications may be made to the above without departing from the scope of the disclosure.

What is claimed is:

1. A computer-implemented method of designing a circuit topology of a circuit, comprising the following steps:
   1) providing one or more first circuit topologies;
   2) simulating said one or more first circuit topologies;
   3) scoring said one or more said first circuit topologies based on a design specification and results of said simulating said one or more first circuit topologies; and
   4) providing one or more second circuit topologies that are dependent on said scoring said one or more said first circuit topologies.

2. The method of claim 1, wherein:
   i) in step 1) providing the one or more first circuit topologies comprises:
      providing an initial circuit topology of said one or more first circuit topologies;
      sequentially updating from the initial circuit topology to provide at least one first subsequent circuit topology, wherein the sequential updating continues until an end condition is met; and/or
   ii) in step 4) providing one or more second circuit topologies comprises:
      providing an initial circuit topology of said one or more second circuit topologies;
      sequentially updating from the initial circuit topology of said one or more second circuit topologies to provide at least one second subsequent circuit topology, wherein the sequential updating is dependent on the scores as determined in step 3) and the sequential updating continues until an end condition is met.

3. The method of claim 2, wherein the end condition is met when at least one of the following occurs:
   said sequentially updating from the initial circuit topology of said one or more first circuit topologies exceeds a limit of sequential updates;
   said sequentially updating from the initial circuit topology of said one or more second circuit topologies exceeds a limit of sequential updates; and
   the score of one of the circuit topologies meets, or exceeds, a target value.

4. The method of claim 1, further comprising the following steps:
   5) simulating said one or more second circuit topologies;
   6) scoring said one or more second circuit topologies based on the design specification and results of said simulating said one or more second circuit topologies; and
   7) if an end condition is not initially met:
      i) providing an updated set of circuit topologies comprising one or more circuit topologies that are dependent on scores as determined in a previous simulation step;
      ii) simulating the updated set of circuit topologies;
      iii) scoring the updated set of circuit topologies based on the design specification and said simulating the updated set of circuit topologies and
      iv) if the end condition is still not met, repeating steps i) to iii) until the end condition is met.

5. The method of claim 4, wherein the end condition is met when at least one of the following occurs:
   the number of sets of circuit topologies meets, or exceeds, a limit value; and
   the score of one of the circuit topologies meets, or exceeds, a target value.

6. The method of claim 4, wherein in step 6) scoring said one or more second circuit topologies comprises updating the score of said one or more first circuit topologies that already has a score as acquired in step 3).

7. The method of claim 1, wherein:
   the design specification comprises one or more circuit properties; and in step 3) scoring said one or more of said first circuit topologies comprises:
comparing one or more of said circuit properties of the design specification to one or more associated property of said one or more first circuit topologies as determined by said simulating said one or more first circuit topologies;
applying a value to a score of said one or more of said first circuit topologies for said one or more said circuit properties of the design specification based on said comparing.

8. The method of claim 7, wherein the one or more circuit properties comprises at least one of a gain, a bandwidth, an input impedance, an output impedance, linearity objectives, transistor number and a circuit area.

9. The method of claim 1, wherein said one or more first circuit topologies comprises an initial circuit topology; and
a step prior to step 1) comprises:
receiving the initial circuit topology from a user; or
generating the initial circuit topology.

10. The method of claim 1, wherein each of said first and second circuit topologies comprises:
a plurality of components; and/or
a plurality of connections, wherein each connection couples at least two components.

11. The method of claim 10, wherein each said component has its type, attributes and connections encoded in a binary format.

12. The method of claim 11, wherein each of said first and second circuit topologies comprises a linear combination of encoded components.

13. The method of claim 10, wherein the components comprise at least one of a node, a transistor, a current source, a voltage source, a resistor, and inductor, a capacitor and an amplifier.

14. The method of claim 10, wherein the components comprise at least one node, wherein the node is one of an input node, an output node, a ground node and a power supply node.

15. The method of claim 1, wherein:
in step 3) said scoring said one or more said first circuit topologies comprises applying a sub-score to one or more aspects of each said one or more said first circuit topologies; and
the sub-scores are weighted based on each of said aspect's contribution to score of its associated circuit topology.

16. The method of claim 15, wherein the aspects of the circuit topology comprise components and/or connections and/or the components and their connections.

17. The method of claim 1, wherein:
in step 1) providing said one or more first circuit topologies is dependent on adherence to constraints; and/or
in step 4) providing said one or more second circuit topologies is dependent on adherence to constraints.

18. The method of claim 1, wherein in step 4) providing said one or more second circuit topologies comprises excluding from said one or more second circuit topologies, circuit topologies having a score, as evaluated in step 3), that are below a threshold score.

19. The method of claim 1, wherein the circuit is an analog circuit.

20. A computer system comprising a module configured as an automated integrated circuit design tool comprising a circuit design system configured to:
1) provide one or more first circuit topologies;
2) simulate said one or more first circuit topologies, to provide a simulation result;
3) score said one or more said first circuit topologies based on a design specification and said simulation result, to provide a scoring; and
4) provide one or more second circuit topologies that are dependent on said scoring.

21. A circuit implementing a circuit topology designed using a method of designing the circuit topology, comprising:
1) providing one or more first circuit topologies;
2) simulating said one or more first circuit topologies;
3) scoring said one or more said first circuit topologies based on a design specification and results of said simulating said one or more first circuit topologies; and
4) providing one or more second circuit topologies that are dependent on said scoring said one or more said first circuit topologies.

* * * * *